SCREW AUGER CONVEYOR WITH ROTATABLE TUBE
Filed Dec. 10, 1964 3 Sheets-Sheet 1
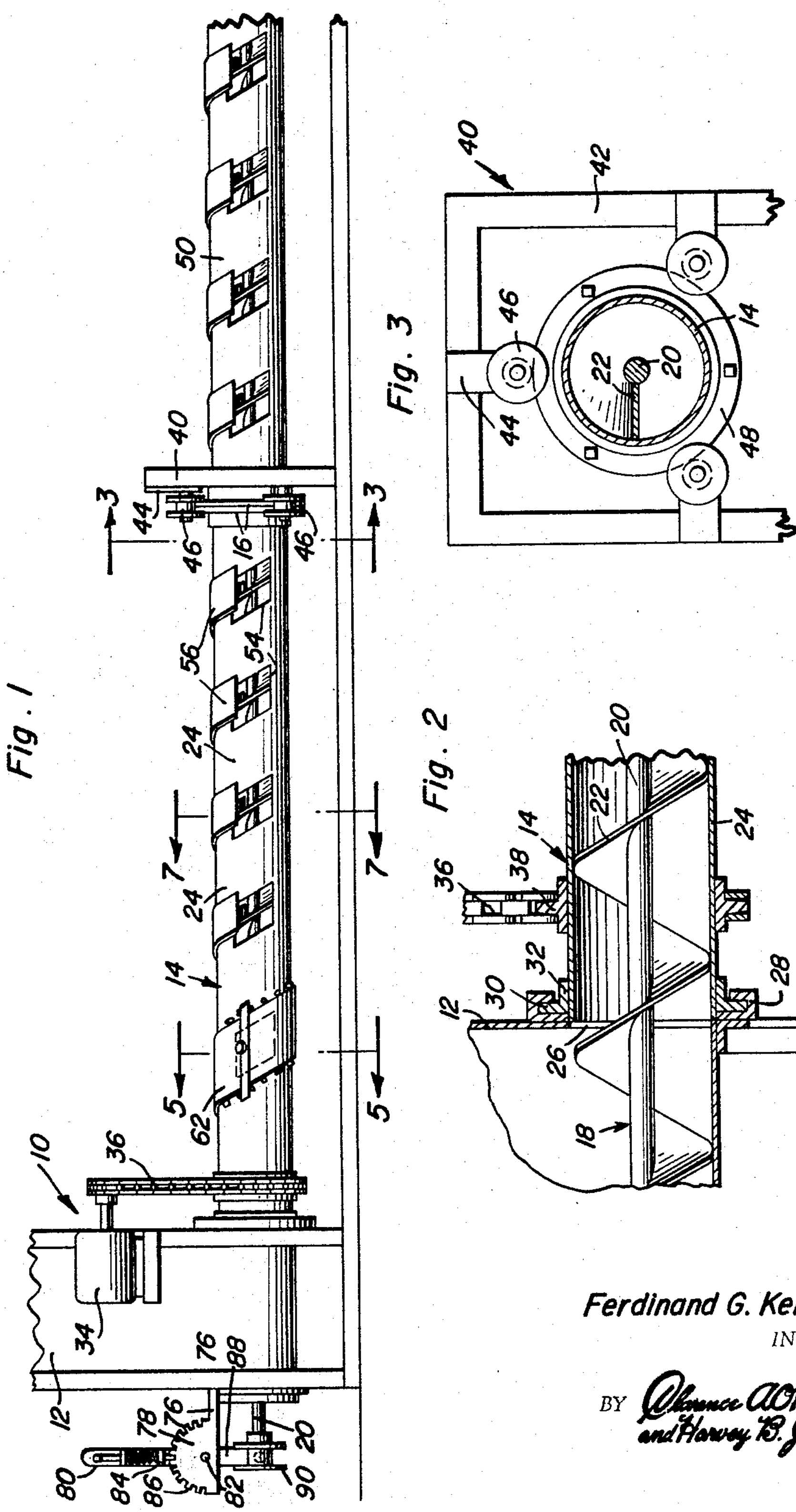
Ferdinand G. Kerkvliet
INVENTOR.
BY Clarence A. O'Brien
and Harvey B. Jacobson
Attorneys

SCREW AUGER CONVEYOR WITH ROTATABLE TUBE

Filed Dec. 10, 1964 3 Sheets-Sheet 2

Ferdinand G. Kerkvliet
INVENTOR.

BY Clarence A. O'Brien
and Harvey B. Jacobson
Attorneys

SCREW AUGER CONVEYOR WITH ROTATABLE TUBE
Filed Dec. 10, 1964 3 Sheets-Sheet 3
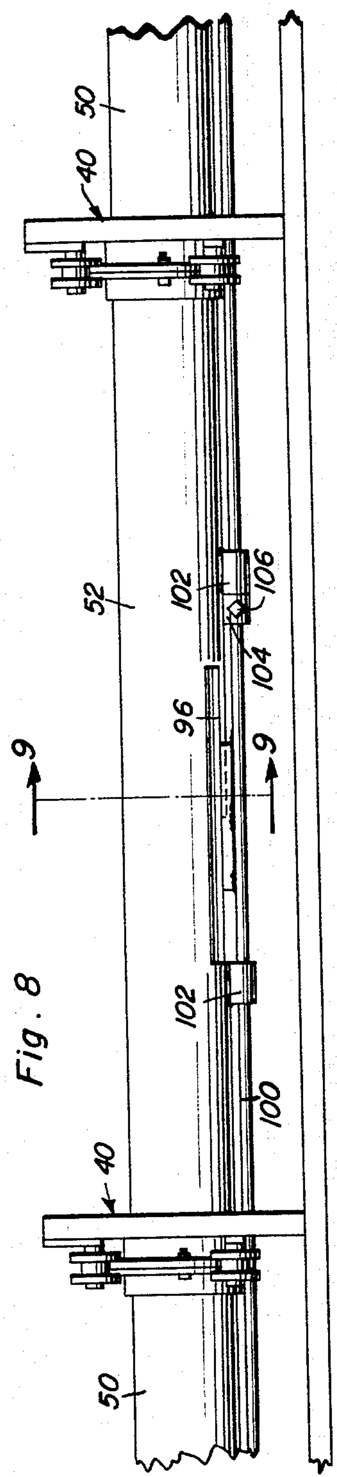
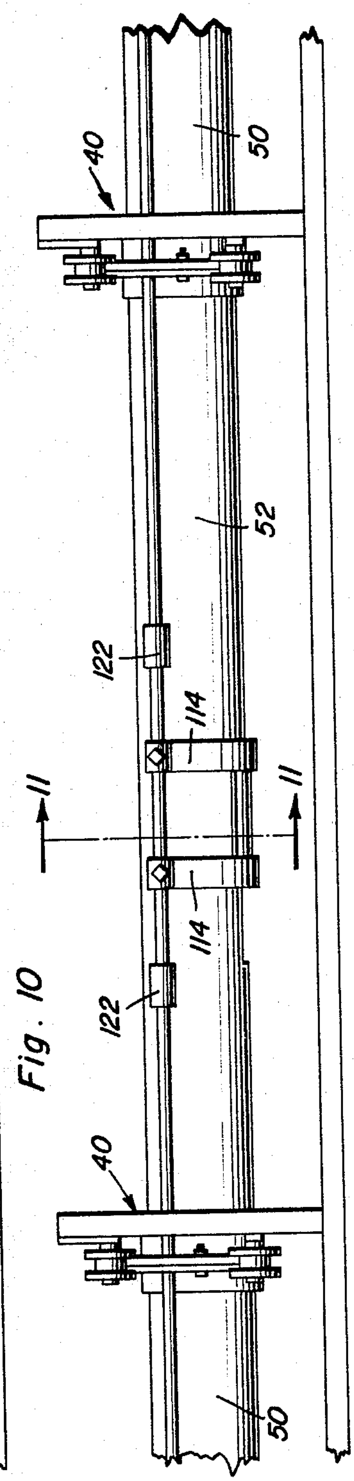
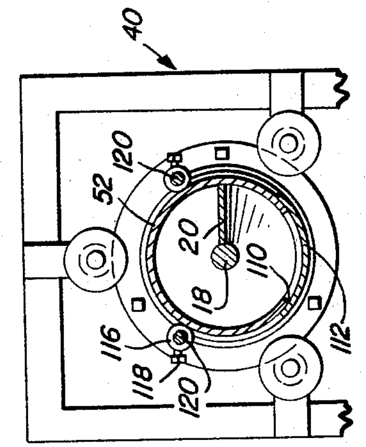
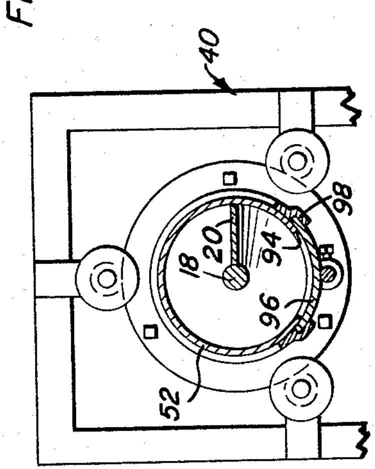
Ferdinand G. Kerkvliet
INVENTOR.
BY Clarence A. O'Brien
and Harvey B. Jacobson
Attorneys United States Patent Office 3,279,592

Patented Oct. 18, 1966

3,279,592

SCREW AUGER CONVEYOR WITH ROTATABLE TUBE

Ferdinand G. Kerkvliet, Larchwood, Iowa

Filed Dec. 10, 1964, Ser. No. 417,311

10 Claims. (Cl. 198—215)

This invention comprises a novel and useful screw auger conveyor with rotatable tube and more particularly pertains to a screw type conveyor having an improved conveying action and controllable delivery by the conveyor at different discharge stations.

It is the primary object of this invention to provide a screw type conveyor having means to substantially eliminate wear between the auger and the tube surrounding the auger by rotating them as a unit without relative rotation therebetween.

A further object of the invention is to provide a conveyor in accordance with the preceding object which will admit of a multiple discharge of material at spaced stations along the conveyor and with a controllably varied discharge at the different stations or alternatively, a controllably varied but same discharge at two or all of the stations.

A still further object of the invention is to provide a conveyor in accordance with the preceding objects wherein the control of the discharge from the conveyor at the different stations is effected by varying the orientation of the auger flight relative to each of said stations.

Still another object of the invention is to provide a conveyor according to the aforementioned objects and wherein the variable discharge is effected by varying the rotational adjustment of the auger relative to the tube.

Still another object of the invention is to provide a conveyor corresponding to the above-mentioned objects wherein a horizontal adjustment of the auger relative to the tube is utilized to produce a controlled variation of the rate of discharge from the auger at the individual stations.

A still further additional object of the invention is to provide an auger conveyor in accordance with the preceding objects wherein both rotary and longitudinal adjustment of the auger relative to the tube is utilized to effect a controlled variation in the discharge of the conveyor at the individual discharge stations thereof.

A further object of the invention is to provide a conveyor mechanism in accordance with the preceding objects wherein adjustable spacers are provided between tube sections of the housing tube for varying the orientation of the auger flights with respect to the discharge openings in the tube between the different tube sections.

And a final important object of the invention to be specifically enumerated herein resides in the provision of a conveyor of the auger type which shall be selectively capable of discharging controlled quantities of material from the conveyor at different stations along the length thereof or alternatively for dumping all of the material from the auger at a single station.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the material inlet end portion of a conveyor in accordance with this invention;

FIGURE 2 is a detailed view in vertical central longitudinal section upon an enlarged scale of the association of the conveyor tube and auger with the material feed hopper or source of material supply;

FIGURE 3 is a detailed view in vertical transverse section taken substantially upon an enlarged scale substantially upon the plane indicated by the section line 3—3 of FIGURE 1;

FIGURE 8 is an elevational view of an intermediate section of the conveyor and of a section to the right of the structure shown in FIGURE 1;

FIGURE 9 is a detailed view in vertical transverse section through an adjustable discharge opening, being taken upon an enlarged scale substantially upon the plane indicated by the section line 9—9 of FIGURE 8;

FIGURE 10 is an elevational view similar to FIGURE 8 but of a modified construction;

Figure 12:
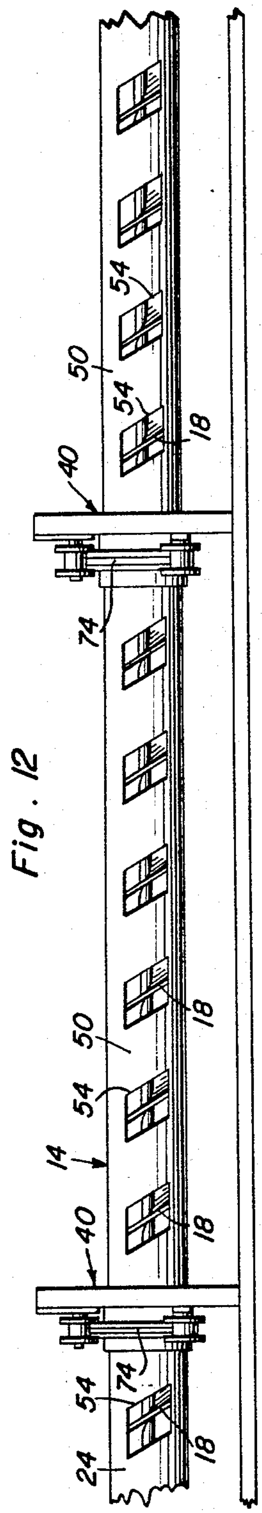

FIGURE 11 is a vertical transverse sectional view taken upon an enlarged scale substantially upon the plane indicated by the section line 11—11 of FIGURE 10; and, FIGURE 12 is an elevational view of a portion of the conveyor illustrating an adjustable spacer means which may be utilized between adjacent sections of the tube for varying the orientation of the auger flight with the openings in the different tube sections.

It is quite common to utilize the auger or screw type of conveyor as a means for moving various materials particularly of a granular or powdery nature from a source of supply such as a hopper or bin to one or more delivery stations along a generally horizontal path. Common examples of such types of conveyors are to be found in various poultry or stock feeding installations. Owing to the frequently extremely long length of the conveyor assembly, when employed as a means for distributing materials to a multiplicity of delivery stations from a common source of supply, the frictional resistance of the flights of the screw type of auger against the interior of the tubular housing or casing of the conveyor causes rapid wear thereby necessitating expensive replacements or repairs from time to time as well as requiring a relatively greater output of power in order to overcome the frictional resistance of the sliding contact of the auger flight with the wall of the housing. The present invention provides a device which largely overcomes these difficulties by locking the auger to the tubular housing so that the two components of the conveyor rotate as a single unit thereby eliminating all wear between the auger and its tube or housing and reducing the power otherwise consumed by the frictional rotational engagement of these components. At the same time, the present invention provides means for ready and novel adjustment of the rate of delivery of material at the different delivery stations along the length of the conveyor and even varying the rate of delivery between the delivery stations of different sections of the conveyor.

In the accompanying drawings, FIGURES 1, 12 and 8 represent respectively axially aligned sections of a single continuous auger or screw type of conveyor to which the principles of this invention have been applied, FIGURE 10 disclosing a modification of the conveyor section of FIGURE 8.

Referring first to FIGURE 1, the numeral 10 designates generally the entire conveyor in accordance with this invention which includes a source of supply of material to be conveyed such as a hopper or bin 12 although it will be appreciated that any other container of the material to be conveyed, whether of a granular or powdery nature, is intended to be designated by the element 10. Cooperating with the source of supply 12 is the conveying unit of the device which consists of a tube or tubular housing designated generally by the numeral 14. The entire length of the housing from its source of supply to its end remote therefrom is made up of a series of tubular sections disposed and connected in axial alignment to each other in any suitable manner as by means of cooperating mating flanges such as those shown at 16.

Disposed within the housing or tube 14 is an auger indicated generally by the numeral 18 and which as shown in FIGURE 2 comprises an auger stem or shaft 20 upon which is disposed a spiral screw forming the conveyor flight 22. As will be apparent from FIGURE 2, the conveyor at its inlet end has its auger extending forwardly beyond the end of the tube for a purpose to be subsequently apparent. The auger may also consist of sections rigidly but detachably connected in end to end relation, so that the entire auger made up of the series of sections may extend along the length of the tubular housing 14. The conveyor auger flight 22 is disposed in a relatively close fitting engagement with the internal wall of the tube or housing 14 so that there is provided a spiral path for the passage of material to be conveyed along the length of the auger and tube to the various discharge or delivery stations as referred to hereinafter. Conveniently, the ends of the auger sections may coincide substantially with the ends of the tube sections so as to facilitate assembling or dismounting of sections of the conveyor for varying the length thereof, for repairs or for other purposes as may be desired.

Referring now more specifically to FIGURE 2 it will be observed that the inlet or forward end of the first section 24 is open, and this opening is in constant communication with a corresponding outlet opening 26 of the hopper 12 for free flow of material from the hopper into the open end of the conveyor tube. In order to provide a seal at this point, between the rotating tube 14 and the hopper or source of supply 12, the hopper has fixedly secured thereto an annular sealing ring 28 which is U-shaped in cross section and which is fixedly and stationarily secured to the hopper. Rotatably received within the sealing ring 28 is the annular sealing rib or sealing flange 30 carried by a cylindrical band 32 which is fixedly secured to and embraces the inlet end of the housing or tube 14. It will thus be apparent that a rotary seal is established between the open end of the tube and the bin or hopper 10 preventing the escape of material at this location.

As previously mentioned, and as shown in FIGURE 2, the forward or inlet end of the auger 18 extends beyond the end of the tube 14 and through the opening 26 into the hopper, receptacle, housing or bin 12. The inwardly extending portion of the auger upon rotation of the latter, positively feeds and forces the material from the source of supply 12 into the open end of the tube and the continual inward feeding of this material forces the latter along the spiral flights or convolutions of the auger blade to the various delivery and discharge openings there along.

As previously mentioned, the auger 18 is stationary with respect to the tube and rotates as a unit therewith. For this purpose means are provided for imparting rotation to the tube and for journalling it or mounting it for rotation along its length. Any convenient means for causing rotation may be utilized, as for example the electric motor 34 with a sprocket chain drive 36 connected to the driven sprocket 38 fixed to the exterior of the first section 24 of the conveyor tube 14. The forward end of this conveyor tube is journalled in the sealing means 28, 30, 32 previously mentioned and along its length, as for example adjacent the junction of the successive sections of the tube, by means of bearing and support structures each indicated generally by the numeral 40.

Referring particularly to FIGURE 3 it will be observed that each of these supports consists of a suitable supporting framework such as that shown at 42 to which are fixedly secured evenly projecting brackets 44 each carrying a support roller 46 engageable with a circular band 48 carried upon the associated section of the tube 14 for thereby rotatably supporting the latter. In some instances, as suggested in FIGURE 1, the two coupling flanges by which adjacent tube sections are joined together may be utilized as the support ring 48 of the tube.

By way of general explanation, the tube 14 preferably comprises the first or forward tube section 24, one or more intermediate tube sections such as those indicated by the numeral 50 and a main discharge or dumping section 52 which may be an end section and may be disposed between the sections 50. Each of the intermediate sections is provided with a plurality of closure controlled discharge or delivery openings along its length whereby material conveyed by the device may be controllably discharged alternatively either at varying rates and quantities but identical for each of a multiplicity of delivery stations along the length of that section or at different controllably varied rates at each station. The section 52, on the other hand, provides a means whereby all of the contents or material carried by the conveyor may be discharged at a single station if desired.

It will be appreciated that various modifications of the tube sections previously mentioned may be utilized in a given installation. For example, the conveyor may include in addition to the first section 24, any desired number of the intermediate sections 50 and a main discharge section 52. Or it may consist of section 24 either alone or with any desired arrangement of the intermediate or main discharge sections 50, 52 connected thereto. Although it is deemed preferable to apply the power for rotating the conveyor to the first section 24, it is evident that power could be applied to any of the other sections if desired.

As previously mentioned, in normal operation the tube and the auger rotate as a unit, there being no relative rotation therebetween. However, it is also highly advantageous to effect a controlled displacement of the auger and its flight from a predetermined orientation of the auger flight with respect to the series of delivery or discharge openings along the length of the tube. This adjustable displacement can be effected in various ways as for example by an axial shifting of the auger within the tube, a rotational displacement of the auger with respect to the tube, an axial displacement of sections of the tube with respect to each other and thus with respect to the relatively stationary auger. Inasmuch as it is possible to utilize advantageously all of these adjusting means in a single installation, the drawings attached hereto disclose such an arrangement.

Figure 6:
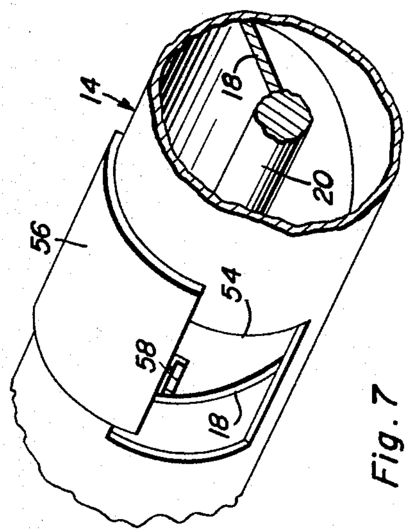
FIGURE 6 is a detailed view in perspective of one of the adjustable discharge gates of the conveyor.
Figure 7:
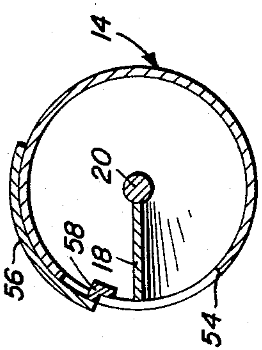
FIGURE 7 is a view in vertical transverse section through the discharge gate of FIGURE 6 taken upon an enlarged scale substantially upon the plane indicated by the section line 7—7 of FIGURE 1.

Referring next to FIGURES 6 and 7 in particular, it will be noted that each of the sections 24 or 50 of the tube 14 is provided with a plurality of longitudinally spaced discharge openings or delivery openings 54 therein which openings extend both circumferentially and longitudinally of the tube. These openings comprise the outlets by which the material carried by the conveyor is controllably discharged and dispensed at selected delivery stations along the length of the conveyor. Preferably the material is discharged when the openings are at the lower portion of their travel during rotation of the conveyor tube. Conveniently, although not necessarily, the openings may be discharged into a chute, bin or the like disposed therebeneath whereby under the influence of gravity material discharged from the conveyor tube will reach its desired destination.

Cooperating with each of the openings 54 is a closure gate 56 which is disposed upon the exterior of the tube and conforms to the convex curvature thereof and is adapted for shifting movement both rotationally and axially therealong. To controllably effect such movement, each of the closure gates 56 is provided with an inwardly projecting portion 58 extending through the opening 54 and which is welded or otherwise fixedly secured to the adjacent flight 18 of the auger. Consequently, as the auger is shifted either rotationally or axially or both a corresponding movement is imparted to the fixedly attached closure gate 56 for thus moving the latter relative to the opening 54 and thereby controlling the effective area of this opening and therefore the rate of discharge therethrough.

As so far described it will now be apparent that all of the discharge or delivery openings 54 of a conveyor tube section may have their closure gates simultaneously controlled through rotational and/or axial movement of the auger with respect to its tubular housing.

Figure 4:
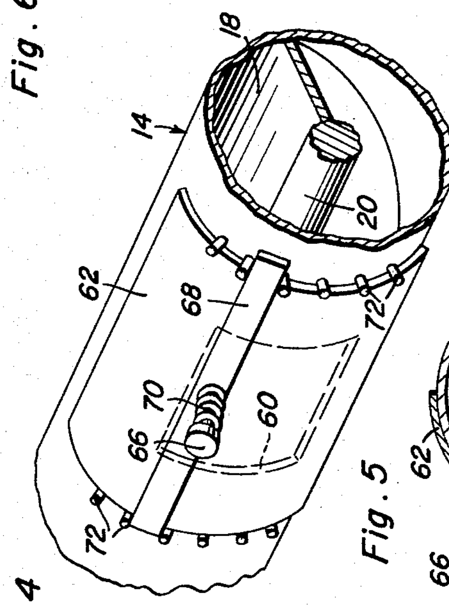
FIGURE 4 is a detailed view in perspective of the means for releasably locking the conveyor tube to the auger in rotationally adjusted positions.
Figure 5:
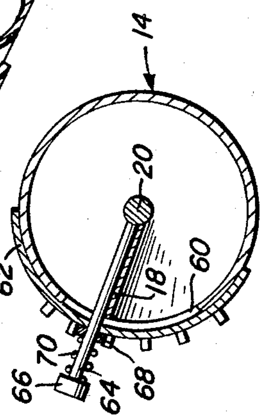
FIGURE 5 is a view in vertical transverse section through the locking means of FIGURE 1, being taken upon an enlarged scale and substantially upon the plane indicated by the section line 5—5 of FIGURE 1.

Although the first tubular section 24 is selected for this purpose, any of the tubular sections may be provided with a means for releasably locking the auger to the associated tubular section against relative rotation therebetween. Referring now to FIGURES 4 and 5, it will be observed that for this purpose the locking means consists of a circumferentially and longitudinally extending slot 60 disposed in the tubular section together with a closure plate 62 disposed upon the exterior of the tubular section and of the same configuration therewith which plate is of a sufficient size to, at all times, despite its relative rotational or axial shifting movement upon the section, always completely close the opening 60 and prevent the escape of material therethrough. Extending through an aperture in this closure plate 62, or fixedly secured thereto is a generally radially extending rod 64 whose inward extremity is fixedly secured as by welding to the auger stem 20 and its outer end is provided with a fitted portion 66. Movably received upon the outward portion of the rod 64 is a latch in the form of a bar 68 which is elongated in the direction of the tubular housing and which is of sufficient length to extend beyond the ends of the closure plate 62. A compression spring 70 is disposed between the latch bar 68 and the head 66 to yieldingly urge the latch bar against the surface of the tubular housing.

Cooperating with the latch bar are latch keepers in the form of pins or projections 72. As will be observed, these pins are disposed in two sets, one set at each end of the opening 60 and with the pins being disposed in pairs, one in each set, in longitudinal alignment across the opening. The arrangement is such that the latch bar may be selectively placed between two pairs of pins and thus releasably and adjustably lock the auger in rotationally adjusted position, within the limits defined by the ends of the slot 60 traversed by the rod 64 releasably and adjustably lock the auger to the tube for rotation therewith.

It will be noted that once the rotational adjustment has been fixed, axial shifting of the tube can be effected due to the sliding of the latch 68 within the keeper projections 72 and the sliding of the rod 64 within the limits of the opening or slot 60.

A further means of adjustment of the closure gates with respect to the delivery or discharge openings is also provided. This means consists of, as shown in FIGURE 12, in the provision of suitable spacer plates 74 of varying thicknesses which are disposed between the two coupling flanges 16 on adjacent sections. Obviously, by varying the spacing of these flanges by the interposition of one or more of the spacer plates 74 therebetween, adjacent tube sections may be disposed at different distances from each other to thereby adjustably displace the openings 54 of one section from those of the adjacent section. Inasmuch as the spiral convolutions of the flight 18 of the auger have a fixed pitch, it is evident that axial shifting of the sections with respect to each other will adjustably vary the orientation of and the registration of a particular flight with a particular discharge opening. As set forth hereinafter, this will in turn adjustably vary the rate of delivery of material through the delivery or discharge opening upon rotation of the auger.

In the operation of this device, it is desired that the discharge or delivery openings shall be so spaced from each other that one convolution only of the auger flight will extend across a respective opening. It will be noted from FIGURE 12 that by way of example in the first section 24, the auger flight 18 is disposed slightly rearwardly of the mid-part of the opening 54 on the first section. In a next adjacent intermediate section 50, the auger flight 18 will be noted to be disposed substantially at the center of the opening 54. However, in the succeeding intermediate section 50, as shown at the right in FIGURE 12, it will be observed that the flight 18 is forwardly of the mid-portion of the opening 54. In operation, the material being forced by the rotation of the units from the source of supply downwardly along the length of the tube will tend to pile up in front of the flight portion 18 which crosses one of the openings. Obviously, the further rearwardly the flight is with respect to the longitudinal extent of the opening, the more material will be discharged therethrough during the time when the opening is at the lower portion of its travel or in a discharging position. Conversely, as the flight moves forwardly of its opening, a lesser quantity of material will be discharged therefrom. Therefore, by axially shifting the auger with respect to the opening, as by use of the spacer plates just mentioned, the delivery from each section can be controllably varied.

In this last-mentioned type of adjustment, it will be observed that by appropriately varying the spacer plates, the relative quantity and rate of delivery of feed from the openings of a given section may be readily varied with respect to those of the other sections. However, it is also possible and it will be usually preferable to obtain the same identical rate of discharge for all of the stations. It is also inherently possible to simultaneously but progressively and proportionately vary the delivery of the material from all of the sections. For this purpose, means are provided for positively axially shifting the auger with respect to the tubular housing 14.

Referring now again to FIGURE 1 it will be seen that there is provided any suitable form of support such as a bracket 76 which may conveniently be mounted upon the hopper 12 and which is provided with a quadrant 78 thereon. A manually operated adjusting lever 80 is pivoted to the quadrant as at 82 and has a spring-urged dog 84 cooperating with the teeth 86 of the quadrant. Thus, the lever can be arcuately adjusted about the quadrant and releasably locked in an adjusted position.

The lower end of the lever is provided with a finger as at 88 which extends into a flanged yoke 90 secured to the extreme forward end of the auger shaft 20. The arrangement is such that by manipulating the lever, the shaft may be positively moved forwardly or backwardly and thus will shift the auger flight with respect to each of the discharge and delivery openings 54.

It is often desirable to be able to use the conveyor for conveying material from the source of supply and dropping the material or dumping the material at a particular discharge station. For this purpose, the section 52 may be conveniently utilized. As shown in the embodiment of FIGURES 8 and 9, the section 52 is provided with a circumferentially and longitudinally extending discharge or dumping opening 94 which is of sufficient size to enable all of the material passing through the section 52 to be discharged through this opening when the latter is at the bottom portion of its rotation. In order to render this opening either wholly or partially inoperative, it is provided with a slidable circumferentially arcuate closure gate or plate 96 which is slidably and guidingly retained upon the exterior of the tubular section 52 for longitudinal sliding movement thereon as by guide channels 98 which overlap the marginal edges of the plate 96. Thus, the plate is confined to the exterior of the section 52 for longitudinal sliding movement there along across the longitudinal extent of the opening 94. In order to effect such movement, there is provided an actuating rod 100 which is suitably secured to the closure gate 96 and is slidably received in guide channels 102 carried by the exterior surface of the section 52, with an adjustable stop collar 104 having a locking screw 106 by means of which the collar is adjustably secured upon the rod 100 and which by engagement of the collar 104 with the guides 102 will limit longitudinal sliding movement of the rod and of the closure gate. In this manner, operation of the rod from a remote location can readily effect opening or closing of the closure gate to dump the contents of the tubular housing therefrom.

In the modified construction shown in FIGURES 10 and 11, the dumping opening 110 is controlled by the transversely arcuate longitudinally extending closure gate 112 which is slidably received upon the exterior surface of the section 52. Transverse, arcuate securing bands 114 are secured to the closure gate and have at their extremities sleeves 116 secured as by adjusting screws 118 upon a pair of control rods 120. The control rods themselves extend through guide sleeves 122 similar to the guides 102 of the preceding embodiment so as to the range of movement of the actuating rods and of the closure gate.

The operation of this embodiment is identical to that previously described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a source of material to be conveyed and a delivery station at which conveyed material is to be discharged, a screw type conveyor comprising an auger and a tube in which said auger is disposed, said tube having an inlet communicating with and said auger extending into said source, said tube having at least one delivery opening means disposed for delivering material from said tube to said delivery station, means for locking said tube to said auger against relative rotation, means mounting said tube for rotation about its longitudinal axis means for imparting rotation to said tube and auger, means to axially adjust the auger relative to the tube whereby the discharge characteristics of said delivery opening means is adjusted.

2. The combination of claim 1 wherein said locking means is mounted on said auger and is releasably engageable with said tube and secures said auger to said tube in rotationably adjustable relation.

3. The combination of claim 1 wherein said locking means is mounted on said auger and is releasably engageable with said tube and secures said auger to said tube in rotationably adjustable relation, and comprises a latch, latch keepers spaced circumferentially of and fixed to said tube and selectively engaged by said latch.

4. The combination of claim 3 wherein said tube has a circumferentially extending opening, said keepers comprising sets of projections on the exterior of said tube on opposite sides of said opening, said latch extending longitudinally of said tube and being selectively engaged between pairs of projections disposed in different sets.

5. The combination of claim 1 wherein said tube has a plurality of longitudinally spaced discharge openings each having a predetermined orientation relative to the flight of the auger, means for adjustably shifting said auger reach relative to said tube and thereby adjustably vary said orientation and the rate of discharge through said discharge opening.

6. The combination of claim 1 wherein said tube has a plurality of longitudinally spaced discharge openings each having a predetermined orientation relative to the flight of the auger, means for adjustably shifting said auger reach relative to said tube and thereby adjustably vary said orientation and the rate of discharge through said discharge opening, said shifting means effecting axial displacement of said auger in said tube.

7. The combination of claim 1 wherein said tube has a plurality of longitudinally spaced discharge openings each having a predetermined orientation relative to the flight of the auger, means for adjustably shifting said auger reach relative to said tube and thereby adjustably vary said orientation and the rate of discharge through said discharge opening, said shifting means effecting rotational displacement of said auger in said tube.

8. The combination of claim 1 wherein said tube has a plurality of longitudinally spaced discharge openings each having a predetermined orientation relative to the flight of the auger, means for adjustably shifting said auger reach relative to said tube and thereby adjustably vary said orientation and the rate of discharge through said discharge opening, said tube comprising axially alined sections through which said auger extends, said shifting means comprising spacer elements disposed between and variably spacing the adjacent ends of adjacent tube sections.

9. The combination of claim 1 wherein said tube has a plurality of longitudinally spaced discharge openings each having a predetermined orientation relative to the flight of the auger, means for adjustably shifting said auger reach relative to said tube and thereby adjustably vary said orientation and the rate of discharge through said discharge opening, said shifting means effecting axial displacement of said auger in said tube, said discharge opening having a closure gate cooperating therewith and slidably disposed upon the exterior of said tube, means rigidly connecting each closure gate through the associated discharge opening to said auger for shifting said closure gates therewith.

10. The combination of claim 1 wherein said delivery opening has a closure gate associated therewith and slidably mounted upon the exterior of said tube and controlling flow through said delivery opening.

References Cited by the Examiner

UNITED STATES PATENTS

| | | | |
|---|---|---|---|
| 2,630,906 | 3/1953 | Philipp | 198—64 |
| 3,053,227 | 9/1962 | Mitchell | 119—52 |
| 3,077,972 | 2/1963 | Mitchell | 198—64 |

EVON C. BLUNK, *Primary Examiner.*

EDWARD A. SROKA, *Examiner.*